(12) United States Patent
Joye

(10) Patent No.: US 8,457,303 B2
(45) Date of Patent: Jun. 4, 2013

(54) FAULT-RESISTANT CALCULCATIONS ON ELLIPTIC CURVES

(75) Inventor: Marc Joye, Cesson-Sevigne (FR)

(73) Assignee: Thomson Licensing, Issy les Moulineaux (FR)

(*) Notice: Subject to any disclaimer, the term of this patent is extended or adjusted under 35 U.S.C. 154(b) by 602 days.

(21) Appl. No.: 12/661,246

(22) Filed: Mar. 12, 2010

(65) Prior Publication Data

US 2010/0232599 A1 Sep. 16, 2010

(30) Foreign Application Priority Data

Mar. 13, 2009 (EP) .................................. 09305236
Jul. 15, 2009 (EP) .................................. 09165551

(51) Int. Cl.
*H04K 3/00* (2006.01)

(52) U.S. Cl.
USPC .............................................. 380/1; 700/89

(58) Field of Classification Search
USPC ............. 380/1, 28; 726/22; 700/89; 714/100, 714/21, 799, 819
See application file for complete search history.

(56) References Cited

U.S. PATENT DOCUMENTS

2009/0034720 A1* 2/2009 Baek et al. ................... 380/30

OTHER PUBLICATIONS

Johannes Blomer, et. al., "Sign Change Fault Attacks on Elliptic Curve Cryptosystems," 2006, Lecture Notes in Computer Science (LNCS); Springer, Berlin, DE, pp. 36-52.
Yoo-Jin Baek et al., "How to Prevent DPA and Fault Attack in a Unified Way for ECC Scalar Multiplication-Ring Extension Method," 2007, LNCS, Berlin, DE, pp. 225-237.
David Vigilant, RSA with CRT: A New Cost-Effective Solution to Thwart Fault Attacks: 2008, LNCS; vol. 5154, pp. 130-145, Berlin, DE.
Otto, "Fault Attacks and Countermeasures", Universitat Paderborn, Dec. 2004.
Joye, Marc "On the Security of a Unified Countermeasure" Fault Diagnostics and Tolerance in Cryptography (FDTC 2008), pp. 87-91.

* cited by examiner

*Primary Examiner* — Kambiz Zand
*Assistant Examiner* — Leynna Truvan
(74) *Attorney, Agent, or Firm* — Tutunjian & Bitetto, P.C.

(57) ABSTRACT

Means for checking the correctness of a cryptographic operation on an elliptic curve $E(Z/pZ)$, including fault-resistant computation of $Q=kP$ on elliptic curve $E(Z/pZ)$. Elliptic curve $\hat{E}(Z/pr^2Z) \equiv E(Z/pZ) \times E(Z/r^2Z)$ is given by Chinese remaindering and where r is an integer. A point $\hat{P}=CRT(P \pmod p, R \pmod{r^2})$ is formed in $\hat{E}(Z/pr^2Z)$; $\hat{P}$ reduces to P in $E(Z/pZ)$, and to R in $E_1(Z/r^2Z)$. $\hat{Q}=k\hat{P}$ in $\hat{E}(Z/pr^2Z)$ is computed (130). It is then verified whether $\hat{Q} \equiv kR \pmod{r^2}$ in $E_1(Z/r^2Z)$, and if so, $Q=\hat{Q} \bmod p$ is output, whereas "error" is returned if this is not the case. Also provided are an apparatus and a computer program product.

10 Claims, 1 Drawing Sheet

FAULT-RESISTANT CALCULCATIONS ON ELLIPTIC CURVES

This application claims the benefit, under 35 U.S.C. §119 of French Patent Applications EP 09305236.3 and EP 09165551.4 filed Mar. 13, 2009 and Jul. 15, 2009, respectively.

TECHNICAL FIELD

The present invention relates generally to cryptography, and in particular to elliptic curve cryptography algorithms resistant against fault attacks.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

A fault attack introduces an error during cryptographic calculations with the intent to obtain one or more bits of a cryptographic secret, such as a private decryption key. Practical ways to mount fault attacks are surveyed in "The Sorcerer's Apprentice Guide to Fault Attacks" by Nagai Bar-El, Hamid Choukri, David Naccache, Michael Tunstall, and Claire Whelan, Proceedings of the IEEE, 94(2):370-382, 2006 (Earlier version in Proc. of FDTC 2004) and in "A Survey On Fault Attacks" by Christophe Giraud and Hugues Thiebeauld, in J.-J. Quisquater, P. Paradinas, Y. Deswarte, and A. A. El Kalam, editors, Smart Card Research and Advanced Applications VI (CARDIS 2004), pages 159-176, Kluwer, 2004.

A RSA (Rivest-Shamir-Adleman) exponentiation consists in raising x to the power of d, on input x in Z/NZ and private exponent d, where Z/NZ is a ring of integers modulo N and N=pq is the product of two large primes. Adi Shamir provided an elegant countermeasure against fault attacks in "How to Check Modular Exponentiation", presented at the rump session of EUROCRYPT'97, Konstanz, Germany, May 13, 1997. The countermeasure is:
1. Compute $y'=x^d$ mod rN for a (small) random integer r,
2. Compute $z=x^d$ mod r,
3. Check whether y'≡z (mod r), and
    if so, output y=y' mod N;
    if not, return "error".

Typically, r is a 64-bit integer. The correctness of Shamir's method is an application of the Chinese remainder theorem (CRT). When the calculations are correct, it is obvious that y'≡y (mod N) and y'≡z (mod r). In the presence of faults, the probability that y'≡z (mod r) is about 1/r. When r is a 64-bit value, this means that a fault is undetected with probability of roughly $2^{-64}$. Larger values for r imply a higher detection probability at the expense of more demanding computations.

Shamir's method can be adapted to protect RSA exponentiations when evaluated in CRT mode; i.e, when $y=x^d$ mod N is evaluated from $x^d$ mod p and $x^d$ mod q. Further generalizations and extensions of Shamir's countermeasure are discussed in "Secure Evaluation of Modular Functions" by Marc Joye, Pascal Paillier, and Sung-Ming Yen, in R. J. Hwang and C. K. Wu, editors, 2001 International Workshop on Cryptology and Network Security, pages 227-229, Taipei, Taiwan, September 2001.

David Vigilant proposed an alternative solution in "RSA With CRT: A New Cost-Effective Solution to Thwart Fault Attacks", in E. Oswald and P. Rohatgi, editors, Cryptographic Hardware and Embedded Systems—CHES 2008, volume 5154 of Lecture Notes in Computer Science, pages 230-145, Springer, 2008. This solution is to:
1. Form $X=CRT(x \pmod N, 1+r \pmod{r^2})$ for a (small) random integer r,
2. Compute $y'=X^d$ mod $r^2N$;
3. Check whether y'≡1+dr (mod $r^2$), and
    if so, output y=y' mod N;
    if not, return "error".

In step 1, CRT denotes an application of the Chinese remainder theorem; namely the so-obtained X satisfies X≡x (mod N) and X≡1+r (mod $r^2$). Hence, we have $y'\equiv x^d$ (mod N) and $y'\equiv (1+r)^d$ (mod $r^2$) when the computations are not faulty. The correctness of step 3 follows from the binomial theorem. We have $$(1+r)^d = \sum_{0 \le k \le d} \binom{d}{k} 1^{d-k} r^k,$$

where $$\binom{d}{k}$$

denotes the binomial coefficient. Reducing this identity modulo $r^2$ gives $(1+r)^d \equiv 1+dr \pmod{r^2}$ and thus y'≡1+dr (mod $r^2$) when the computations are not faulty. The probability that a fault is undetected is expected to be about $1/r^2$. As a result, a 32-bit value for r in Vigilant's method should provide the same security level as a 64-bit value for r in Shamir's method.

Vigilant's method presents a couple of advantages over Shamir's method. In particular, it trades the exponentiation $z=x^d$ mod r against the multiplication 1+dr mod $r^2$, which is much faster, although it will be appreciated that the evaluation of z in Shamir's method can be sped up as $x^{d \bmod \phi(r)}$ mod r (where φ denotes Euler's totient function), provided that the value of φ(r) is known. In addition, Vigilant's method applies to RSA in CRT mode.

The description of Shamir's and Vigilant's countermeasures have been done with their application to RSA. However, it will be appreciated that elliptic curve cryptography (ECC) is an interesting alternative to RSA because the keys are much shorter for a same conjectured security level.

In ECC, given a point P on an elliptic curve E and an integer k, the basic operation consists in computing the scalar multiplication kP, that is, P+P+ . . . +P (k times) where + denotes the group operation on E. A goal of an attacker is to recover the value of k (or a part thereof) by inducing faults.

While Shamir's countermeasure generalizes to elliptic curve scalar multiplication (see, e.g. Johannes Blömer, Martin Otto, and Jean-Pierre Seifert: "Sign Change Fault Attacks on Elliptic Curve Cryptosystems". In L. Breveglieri, I. Koren, D. Naccache, and J.-P. Seifert, editors, Fault Diagnosis and Tolerance in Cryptography—FDTC 2006, volume 4236 of Lecture Notes in Computer Science, pages 36-52. Springer-Verlag, 2006.), Vigilant's method does not readily lend itself to a generalization to elliptic curve scalar multiplication since there is no equivalent to the binomial theorem.

It can therefore be appreciated that there is a need for a solution that provides an alternative countermeasure against fault attacks on ECC. This invention provides such a solution.

SUMMARY OF INVENTION

In a first aspect, the invention is directed to a method for checking the correctness of a cryptographic operation on a first elliptic curve $E(Z/pZ)$. A processor obtains a third elliptic curve $\hat{E}(Z/pr^2Z) \equiv E(Z/pZ) \times E(Z/r^2Z)$ given by Chinese remaindering from the first elliptic curve $E(Z/pZ)$ and a second elliptic curve $E(Z/r^2Z)$, where r is an integer; performs the operation on $\hat{E}(Z/pr^2Z)$ to obtain a first result; performs the operation on $E_1(Z/r^2Z)$, where $E_1(Z/r^2Z)$ denotes the subset of points in $E(Z/r^2Z)$ that reduce modulo r to the identity element on $E(Z/rZ)$, to obtain a second result; verifies that the first result and the second result are equal in $E_1(Z/r^2Z)$; and if this is the case, outputs the first result of the operation in $\hat{E}(Z/pr^2Z)$ reduced modulo p.

In a first preferred embodiment, the cryptographic operation is a scalar multiplication in $E(Z/pZ)$, for fault-resistant computation of Q=kP on elliptic curve $E(Z/pZ)$. A point $\hat{P}$=CRT(P (mod p), R (mod $r^2$)) is formed in $\hat{E}(Z/pr^2Z)$ such that $\hat{P}$ reduces to P in $E(Z/pZ)$, and to R in $E_1(Z/r^2Z)$, where CRT denotes the Chinese remaindering method. $\hat{Q}$=k$\hat{P}$ in $\hat{E}(Z/pr^2Z)$ is computed and it is verified whether $\hat{Q} \equiv$ kR(mod $r^2$) in $E_1(Z/r^2Z)$ and Q=$\hat{Q}$ mod p is output only if this the case.

In a second preferred embodiment, the integer r is chosen randomly.

In a third preferred embodiment, the integer r has a predetermined value.

It is advantageous that the integer r is a prime.

It is also advantageous that the point R in $E_1(Z/r^2Z)$ is chosen randomly.

In a further preferred embodiment, the elliptic curve is represented as an Edwards curve or as a Jacobi curve.

In a second aspect, the invention is directed to an apparatus for checking the correctness of a cryptographic operation on a first elliptic curve $E(Z/pZ)$. The apparatus comprises a processor for obtaining a third elliptic curve $\hat{E}(Z/pr^2Z) \equiv E(Z/pZ) \times E(Z/r^2Z)$ given by Chinese remaindering from the first elliptic curve $E(Z/pZ)$ and a second elliptic curve $E(Z/r^2Z)$, where r is an integer; performing the operation on $\hat{E}(Z/pr^2Z)$ to obtain a first result; performing the operation on $E_1(Z/r^2Z)$, where $E_1(Z/r^2Z)$ denotes the subset of points in $E(Z/r^2Z)$ that reduce modulo r to the identity element on $E(Z/rZ)$, to obtain a second result; verifying that the first result and the second result are equal in $E_1(Z/r^2Z)$; and if this is the case; outputting the first result of the operation in $\hat{E}(Z/pr^2Z)$ reduced modulo p.

In a first preferred embodiment, the cryptographic operation is a scalar multiplication in $E(Z/pZ)$, for fault-resistant computation of Q=kP on an elliptic curve $E(Z/pZ)$. The processor is further for forming a point $\hat{P}$=CRT(P (mod p), R (mod $r^2$)) in $\hat{E}(Z/pr^2Z)$ such that $\hat{P}$ reduces to P in $E(Z/pZ)$, and to R in $E_1(Z/r^2Z)$, where CRT denotes the Chinese remaindering method; computing $\hat{Q}$=k$\hat{P}$ in $\hat{E}(Z/pr^2Z)$; verifying whether $\hat{Q} \equiv$ kR (mod $r^2$) in $E_1(Z/r^2Z)$ and outputting Q=$\hat{Q}$ mod p only if this the case.

In a third aspect, the invention is directed to a computer program product having stored thereon instructions that, when executed by a processor, performs the method according to any of the embodiments of the first aspect.

BRIEF DESCRIPTION OF DRAWINGS

Preferred features of the present invention will now be described, by way of non-limiting example, with reference to the accompanying drawings, in which.

DESCRIPTION OF EMBODIMENTS

Let R be a ring and E(R) denote the set of rational points on elliptic curve E defined over R. Considering the elliptic curve defined over the ring $Z/r^2Z$ of integers modulo $r^2$, a subset is defined as $$E_1(Z/r^2Z) = \{P \text{ in } E(Z/r^2Z) | P \text{ modulo } r \text{ reduces to } \delta\}$$

where $\delta$ denotes the identity element on $E(Z/rZ)$.

Figure 1:
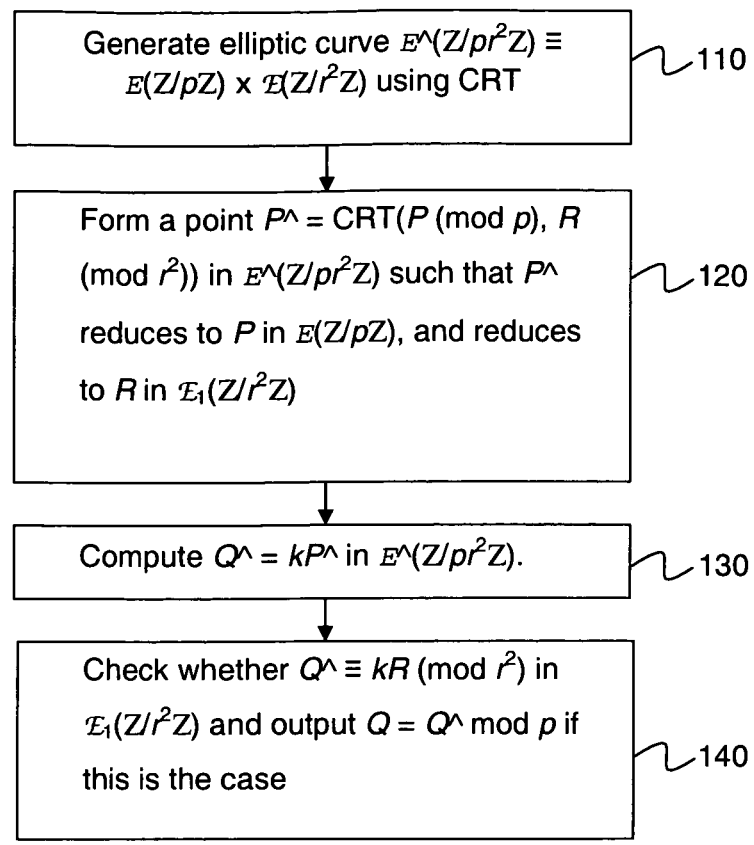
FIG. 1 is a flow chart illustrating the fault-resistant method according to a preferred embodiment of the invention.

FIG. 1 is a flow chart illustrating the fault-resistant method according to a preferred embodiment of the invention. Fault-resistant computation of Q=kP on elliptic curve $E(Z/pZ)$ may be performed using the following method:

1. Consider 110 the elliptic curve $\hat{E}(Z/pr^2Z) \equiv E(Z/pZ) \times E(Z/r^2Z)$ given by Chinese remaindering and where r is a (small) integer.
2. Form 120 a point $\hat{P}$=CRT(P (mod p), R (mod $r^2$)) in $\hat{E}(Z/pr^2Z)$; namely, a point $\hat{P}$ such that
   a. $\hat{P}$ reduces to P in $E(Z/pZ)$, and
   b. $\hat{P}$ reduces to R in $E_1(Z/r^2Z)$.
3. Compute 130 $\hat{Q}$=k$\hat{P}$ in $\hat{E}(Z/pr^2Z)$.
4. Check 140 whether $\hat{Q} \equiv$ kR (mod $r^2$) in $E_1(Z/r^2Z)$, and if so, output Q=$\hat{Q}$ mod p;
   if not, return "error".

It is worth noting that kR can be computed in $E_1(Z/r^2Z)$ in the checking step (i.e. step 4 above), which is much faster than computing it in $E(Z/r^2Z)$. Depending on the elliptic curve representation, this typically amounts to one multiplication modulo $r^2$. It will be appreciated that, in $E_1(Z/r^2Z)$, kR=(k mod r)R.

The described method has numerous variants. For example, the integer r can either be chosen randomly or be fixed to a predetermined value. This integer may also be chosen as a prime. The same holds for point R in $E_1(Z/r^2Z)$, i.e. it can be chosen randomly or be fixed to a predetermined value.

Further, checking step 4 may be performed in several ways; in particular, it can be implemented using so-called infective computation so as to avoid explicit branching instructions. Infective computation is described in "RSA Speedup With Chinese Remainder Theorem Immune Against Hardware Fault Cryptanalysis" by Sung-Ming Yen, Seungjoo Kim, Seongan Lim, and Sang-Jae Moon; IEEE Transactions on Computers, 52(4):461-472, 2003; (earlier version in Proc. of ICISC 2001) and in "Sign Change Fault Attacks On Elliptic Curve Cryptosystems" by Johannes Blömer, Martin Otto, and Jean-Pierre Seifert; in L. Breveglieri, I. Koren, D. Naccache, and J.-P. Seifert, editors, Fault Diagnosis and Tolerance in Cryptography—FDTC 2006, volume 4236 of Lecture Notes in Computer Science, pages 36-52; Springer-Verlag, 2006.

In addition, the elliptic curve may be represented in different ways. Of particular interest are the so-called complete models because the identity element then does not need a special treatment. Examples of such curves are Edwards curves (described by Daniel J. Bernstein and Tanja Lange in "Faster Addition and Doubling on Elliptic Curves", in K. Kurosawa, editor, Advances in Cryptology—ASIACRYPT 2008, volume 4833 of Lecture Notes in Computer Science, pages 29-50; Springer, 2007) and Jacobi curves (described by Olivier Billet and Marc Joye in "The Jacobi Model of An Elliptic Curve and Side-Channel Analysis", in M. Fossorier, T. Hoholdt, and A. Poli, editors, Applied Algebra, Algebraic Algorithms and Error-Correcting Codes (AAECC-15), volume 2643 of Lecture Notes in Computer Science, pages 34-42; Springer, 2003).

Figure 2:
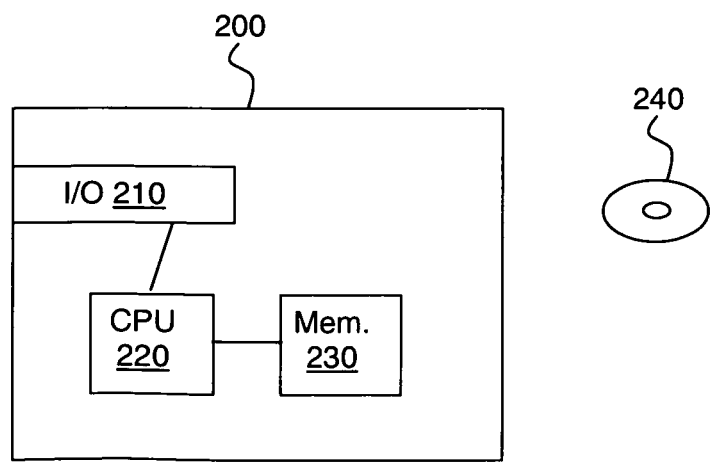
FIG. 2 illustrates an apparatus for executing fault-resistant elliptic curve cryptography calculations according to a preferred embodiment of the invention.

FIG. 2 illustrates a device according to a preferred embodiment of the present invention. The device 200 comprises at least one interface unit 210 adapted for communication with other devices (not shown), at least one processor 220 and at least one memory 230 adapted for storing data, such as accumulators and intermediary calculation results. The processor 220 is adapted to calculate an exponentiation according to any of the embodiments of the inventive methods, as previously described herein. A computer program product 240 such as a CD-ROM or a DVD comprises stored instructions that, when executed by the processor 220, performs the method according to any of the embodiments of the invention.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A method for checking the correctness of a cryptographic operation on a first elliptic curve $E(Z/pZ)$, the method being resistant against fault attacks and comprising the steps of:
    obtaining, by a processor, a third elliptic curve $\hat{E}(Z/pr^2Z) \equiv E(Z/pZ) \times E(Z/r^2Z)$ given by Chinese remaindering from the first elliptic curve $E(Z/pZ)$ and a second elliptic curve $E(Z/r^2Z)$, where r is an integer;
    performing the cryptographic operation on $\hat{E}(Z/pr^2Z)$ to obtain a first result;
    performing the cryptographic operation on $E_1(Z/r^2Z)$, where $E_1(Z/r^2Z)$ denotes the subset of points in $E(Z/r^2Z)$ that reduce modulo r to the identity element on $E(Z/rZ)$, to obtain a second result;
    verifying that the first result and the second result are equal in $E_1(Z/r^2Z)$; and if this is the case;
    outputting the first result of the operation in $\hat{E}(Z/pr^2Z)$ reduced modulo p.

2. A method according to claim 1, wherein the cryptographic operation is a scalar multiplication in $E(Z/pZ)$, for fault-resistant computation of $Q=kP$ on elliptic curve $E(Z/pZ)$, the method comprising the steps of:
    forming a point $\hat{P}=CRT(P \pmod p), R \pmod{r^2})$ in $\hat{E}(Z/pr^2Z)$ such that $\hat{P}$ reduces to P in $E(Z/pZ)$, and to R in $E_1(Z/r^2Z)$, where CRT denotes the Chinese remaindering method;
    computing $\hat{Q}=k\hat{P}$ in $\hat{E}(Z/pr^2Z)$;
    verifying whether $\hat{Q} \equiv kR \pmod{r^2}$ in $E_1(Z/r^2Z)$ and outputting $Q=\hat{Q} \bmod p$ only if this the case.

3. The method of claim 1, wherein the integer r is chosen randomly.

4. The method of claim 1, wherein the integer r has a predetermined value.

5. The method of claim 3, wherein the integer r is a prime.

6. The method of claim 2, wherein the point R in $E_1(Z/r^2Z)$ is chosen randomly.

7. The method of claim 1, wherein the elliptic curve is represented as an Edwards curve or as a Jacobi curve.

8. An apparatus for checking the correctness of a cryptographic operation on a first elliptic curve $E(Z/pZ)$, the apparatus being resistant against fault attacks and comprising a processor with an associated non-transitory storage medium and configured to:
    obtain a third elliptic curve $\hat{E}(Z/pr^2Z) \equiv E(Z/pZ) \times E(Z/r^2Z)$ given by Chinese remaindering from the first elliptic curve $E(Z/pZ)$ and a second elliptic curve $E(Z/r^2Z)$, where r is an integer;
    perform the cryptographic operation on $\hat{E}(Z/pr^2Z)$ to obtain a first result;
    perform the cryptographic operation on $E_1(Z/r^2Z)$, where $E_1(Z/r^2Z)$ denotes the subset of points in $E(Z/r^2Z)$ that reduce modulo r to the identity element on $E(Z/rZ)$, to obtain a second result;
    verify that the first result and the second result are equal in $E_1(Z/r^2Z)$; and if this is the case;
    output the first result of the operation in $\hat{E}(Z/pr^2Z)$ reduced modulo p.

9. The apparatus according to claim 8, wherein the cryptographic operation is a scalar multiplication in $E(Z/pZ)$, for fault-resistant computation of $Q=kP$ on an elliptic curve $E(Z/pZ)$, the processor further being configured to:
    form a point $\hat{P}=CRT(P \pmod p), R \pmod{r^2})$ in $\hat{E}(Z/pr^2Z)$ such that $\hat{P}$ reduces to P in $E(Z/pZ)$, and to R in $E_1(Z/r^2Z)$, where CRT denotes the Chinese remaindering method;
    compute $\hat{Q}=k\hat{P}$ in $\hat{E}(Z/pr^2Z)$; and
    verify whether $\hat{Q} \equiv kR \pmod{r^2}$ in $E_1(Z/r^2Z)$ and outputting $Q=\hat{Q} \bmod p$ only if this the case.

10. A computer program product stored on a non-transitory computer readable storage medium embodying instructions that, when executed by a processor, performs the method of claim 1.

* * * * *